United States Patent Office 3,185,707
Patented May 25, 1965

3,185,707
ALPHA SUBSTITUTED PHENYL ACETO NITRILES AND HYDROCINNAMONITRILES AND THE CORRESPONDING CARBAMATES THEREOF
Joseph Albert Meschino, North Wales, Pa., assignor to McNeil Laboratories, Incorporated, a corporation of Pennsylvania
No Drawing. Filed Apr. 19, 1961, Ser. No. 103,985
15 Claims. (Cl. 260—340.5)

This invention relates to a new series of organic compounds represented by the following general formula

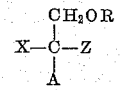

and methods for their preparation.

Z in the above general formula stands for the nitrile or carboxamide radical, and A represents aryl, substituted aryl or hydrogen. Aryl includes monocyclic aryl, such as phenyl and fused rings, such as naphthyl which may be substituted by lower alkyl, lower alkoxy, amino, halo or aminoalkyl groups.

X in the above general formula represents a monocyclic aryl, diarylalkyl or aralkyl nucleus, e.g. phenyl, benzhydryl or benzyl which may be unsubstituted or substituted by lower alkyl residues; hydroxyl groups; free, etherified or esterified hydroxyl groups; lower alkoxy; alkylmercapto; alkylenedioxy; alkanoyloxy; alkoxycarbonyloxy; nitro; halo; free or esterified carboxy; primary, secondary or tertiary amino. As examples of such radicals may be given lower alkyl substituted benzyl, e.g. ortho-methyl-, para-methyl- or 3:4:5-trimethylbenzyl; hydroxy-substituted benzyl, such as 4-hydroxy-, 3:4-dihydroxy-, or 2:5-trihydroxybenzyl; lower alkoxy-substituted benzyl, such as 4-methoxy-, 3:4-dimethoxy-, 3:4:5-trimethoxy-, 4-ethoxy-, 3:4:5-triethoxybenzyl; vanillyl or syringyl; lower alkylenedioxybenzyl, such as 3:4-methylenedioxybenzyl; lower alkanoylbenzyl, such as 4-acetoxybenzyl; lower alkoxycarbonyloxybenzyl, such as O-lower alkoxycarbonylvanillyl or syringyl, for example O-ethoxycarbonylvanillyl, O-methoxycarbonylsyringyl, or O-ethoxycarbonylsyringyl; nitro-substituted benzyl, such as 3- or 4-nitrobenzyl; amino-substituted benzyl, such as 3- or 4-aminobenzyl; di-lower alkylaminobenzyl, such as 3- or 4-dimethylaminobenzyl; halogen-substituted benzyl, such as 4-fluoro or 4-chlorobenzyl, or 3:4-dichlorobenzyl; lower alkylmercapto-substituted benzyl, such as 4-methylmercaptobenzyl; aralkyheterocyclo, such as benzyl-piperazino; methylbenzylpiperazino, 3:4-dimethylbenzylpiperazino; and the correspondingly substituted phenyl and benzhydryl groups. It will be further understood that, in the above general formula, when X is phenyl or lower alkyl-substituted phenyl, A is limited to aryl or substituted aryl.

R in the above general formula represents hydrogen; amino carbonyl wherein the amine group is primary, secondary or tertiary; or an acyl function. Examples of such substituents include lower alkylaminocarbonyl, di-lower alkylaminocarbonyl, i.e. dimethylaminocarbonyl, diethylaminocarbonyl, N-cyclopentyl - N - methylaminocarbonyl, N-benzyl-N-methylaminocarbonyl, pyrrolidinocarbonyl, piperidinocarbonyl, 4 - methyl-piperidino-carbonyl, morpholinocarbonyl, thiamorpholinocarbonyl, piperazino-carbonyl, or 4-methylpiperazinocarbonyl. Examples of acyl groups include radicals of aromatic, aliphatic, heterocyclic or araliphatic carboxylic acids, such as a lower fatty acid, e.g. acetic or propionic; a phenyl carboxylic acid, e.g. alkoxy-phenyl carboxylic acid, such as 4-methoxy benzoic acid; 3,4-dimethoxybenzoic acid; 3,4,5-trimethoxybenzoic acid; 3,4-methylenedioxy benzoic acid; syringic acid; O-carbalkoxysyringic acid; alkoxyphenyl aliphatic carboxylic acid, e.g. alkoxycinnamic acid.

A variety of methods may be employed for the preparation of the novel compounds of this invention. However, a particularly useful and unique method has been found which is superior and is distinguishable from those presently known. It is intended that this method be included in the scope of the present invention. In a general way, the novel process comprises reducing the appropriate nitrile ester with a hydrogenating agent in the presence of an organic solvent, if so desired, to obtain the corresponding alcohol. Preferred reducing agents for this purpose are the metal hydrides, such as lithium aluminum alkoxy hydrides, e.g. lithium aluminum tritertiary butoxy hydride, lithium aluminum triethoxy hydride, or lithium aluminum triisopropoxy hydride; alkali metal borohydrides, e.g. potassium borohydride, sodium borohydride, or lithium borohydride; diboranes and substituted boranes, such as alkyl-substituted boranes. Suitable as solvents for the reduction reaction are the inert organic or water miscible organic solvents, such as the lower alkanols, e.g. methanol, ethanol, or preferably 2-propanol. Alternatively, tetrahydrofuran, ether dioxane, benzene, toluene, xylene or di-n-butyl ether may be employed.

Those compounds in the novel series wherein Z represents carboxamido may be obtained by hydrolysis of the corresponding nonester-bearing nitrile alcohols with an appropriate hydrolytic agent, such as sulfuric acid, phosphoric acid, hydrochloric acid, alkali metal hydroxides, such as sodium hydroxide and potassium hydroxide or, preferably, hydrogen peroxide in the presence of a mild base such as an alkali metal hydroxide carbonate or bicarbonate. Further, the carbamoyl nitrile and carbamoyl amide derivatives are obtained by treating the alkanolic nitrile, or its functional derivative, i.e. carboxamide, with a reactive ester of a lower alkanol, e.g. a lower alkylcarbamate, such as ethylcarbamate, in the presence of an aluminum alkoxide, e.g. aluminum isopropoxide and an organic solvent, such as toluene, benzene, xylene, hexane, heptane, tetrahydrofuran, carbon tetrachloride, chloroform, chlorobenzene, diethylether or dioxane.

Alternatively the carbamate series of the novel compounds of this invention may be prepared by reacting the appropriately substituted hydroxymethyl compound, i.e. one wherein, in the above general formula, R stands for hydrogen, successively with phosgene and ammonia.

Still another novel method which is intended to be included within the scope of the present invention relates to the preparation of those compounds of the present series wherein R is hydrogen and Z is nitrile by treating the appropriately disubstituted acetonitrile with formaldehyde in the presence of a weak base such as calcium oxide, alkali metal carboxate or bicarbonate or triethylamine.

The novel compounds of this invention are useful as central nervous system depressants. They may be used in admixture with suitable nontoxic solid or liquid carriers in the form of tablets, pills, capsules, or in liquid form, such as solutions, suspensions or emulsions. They may be admixed, if desired, with other compatible and physiological substances.

*Example I*

To a stirred, cooled suspension of 11.4 parts by weight of sodium borohydride in 50 parts by volume of 2-propanol is added slowly a suspension of 27.7 parts by volume of ethyl alpha-cyano-beta-phenylcinnamate in 200 parts by volume of 2-propanol. The mixture is stirred at room temperature for a period of eight hours, after which the excess borohydride mixture concentrated to small volume under reduced pressure. The residue is taken up in ether and washed repeatedly with dilute hydrochloric acid and finally with water. After drying over magnesium sulfate, the solvent is removed under reduced pressure to yield alpha - hydroxymethyl - beta - phenylhydrocinnamonitrile, melting point 102° C.–104° C.

*Example II*

A cold solution of 25 parts by weight of veratrialdehyde, 168 parts by weight of ethyl cyanoacetate and 5 parts by volume of piperidine in 50 parts by volume of dioxane is allowed to stand for about eight hours. The mixture is brought to room temperature and diluted with water. The crystalline precipitate is filtered and dried to yield ethyl alpha-cyano-3,4-dimethoxycinnamate, melting point 151° C.

To a stirred, cooled suspension of 4.3 parts by weight of sodium borohydride in 25 parts by volume of 2-propanol is added slowly 10 parts by weight of solid ethyl alpha-cyano-3,4-dimethoxycinnamate. The mixture is stirred at room temperature for eight hours, after which the excess borohydride is destroyed with aqueous acetic acid. The resulting mixture is concentrated under reduced pressure to a small volume. The residue is taken up in chloroform and washed repeatedly with dilute hydrochloric acid and, finally, with water. After drying over anhydrous magnesium sulfate, the solvent is removed under reduced pressure to yield alpha-hydroxymethyl-3,4-dimethoxyhydrocinnamonitrile, melting point 95.5° C.–96.5° C.

*Example III*

A cold solution of 15 parts by weight of piperanol, 11.2 parts by weight of ethyl cyanoacetate and 0.4 part by volume of piperidine in 50 parts by volume of dioxane is allowed to stand for eight hours. The mixture is brought to room temperature and diluted with water. The crystalline precipitate is filtered and dried to yield 11.1 parts by weight of ethyl alpha-cyano-3,4-methylenedioxycinnamate, melting point 105° C.–106° C.

To a stirred, cooled suspension of 17 parts by weight of sodium borohydride in 50 parts by volume of 2-propanol is added slowly 40 parts by weight of solid ethyl alpha-cyano-3,4-methylenedioxycinnamate. The mixture is stirred at room temperature for about eight hours, after which the excess borohydride is destroyed with aqueous acetic acid. The resulting mixture is concentrated to small volume under reduced pressure, the residue is taken up in chloroform and washed repeatedly with dilute hydrochloric acid and, finally, with water. After drying over anhydrous magnesium sulfate, the solvent is removed under reduced pressure to yield alpha-hydroxymethyl-3,4-methylenedioxyhydrocinnamonitrile, boiling point/.5 mm. 153° C.

A mixture of 20.5 parts by weight of alpha-hydroxymethyl-3,4-methylenedioxyhydrocinnamonitrile and 11.9 parts by weight of phenylisocyanate is heated on a steam bath for a period of thirty minutes, after which it is triturated and washed with ligroin. The solid product is recrystallized from carbon tetrachloride-ether to give alpha - (N-phenylcarbamoyloxymethyl) - 3,4 - methylenedioxyhydrocinnamonitrile, melting point 114° C.–115° C.

*Example IV*

A solution of 20 parts by weight of anisaldehyde, 16.5 parts by weight of ethyl cyanoacetate and 0.5 part by volume of piperidine in 30 parts by volume of dioxane is allowed to stand in a refrigerator overnight. It is then diluted with water. The precipitate is collected and recrystallized from methanol to give alpha-cyano-4-methoxycinnamate, melting point 80° C. to 84° C.

To a stirred, cooled suspension of 4.1 parts by weight of sodium borohydride in 100 parts by volume of 2-propanol is added 23 parts by weight of solid ethyl alpha-cyano-4-methoxycinnamate. The mixture is stored at room temperature for about eight hours, after which the excess borohydride is destroyed with aqueous acetic acid. The resulting mixture is concentrated to a small volume under reduced pressure. The residue is taken up in chloroform and washed repeatedly with dilute hydrochloric acid and finally with water. After drying over anhydrous magnesium sulfate, the solvent is removed under reduced pressure to yield an oil which is distilled at 0.1 mm. to give crystalline alpha-hydroxymethyl-4-methoxyhydrocinnamonitrile, melting point 80.5° C.–81.5° C.

*Example V*

A cold solution of 15 parts by weight of 3,4,5-trimethoxybenzaldehyde, 8.7 parts by weight of ethyl cyanoacetate and 0.5 part by volume of piperidine in 35 parts by volume of dioxane is allowed to stand for about eight hours. The mixture is brought to room temperature and diluted with water. The crystalline precipitate is filtered and dried to yield ethyl alpha-cyano-3,4,5-trimethoxycinnamate, melting point 81.5° C.–82.5° C.

To a stirred, cooled suspension of 5.8 parts by weight of sodium borohydride in 125 parts by volume of 2-propanol is added slowly 15 parts by weight of solid ethyl alpha-cyano-3,4,5-trimethoxycinnamate. The mixture is then stirred at room temperature for a period of eight hours, after which the excess borohydride is destroyed with aqueous acetic acid. The mixture is concentrated to small volume under reduced pressure. The residue is taken up in chloroform and washed repeatedly with dilute hydrochloric acid and finally with water. After drying over anhydrous magnesium sulfate, the solvent is removed under reduced pressure to yield 12 parts by weight of alpha - hydroxymethyl - 3,4,5 - trimethoxyhydrocinnamonitrile, melting point 65° C.–66° C.

*Example VI*

A cold solution of 20 parts by weight of benzaldehyde, 21 parts by weight of ethyl cyanoacetate with 0.5 part by volume of piperidine in 30 parts by volume of dioxane is allowed to stand for a period of eight hours. The mixture is concentrated under reduced pressure to give a precipitate of ethyl alpha-cyanocinnamate, melting point 46° C.–48° C.

To a stirred, cooled suspension of 11.4 parts by weight of sodium borohydride in 125 parts by volume of 2-propanol is added slowly 20 parts by weight of solid ethyl alpha-cyanocinnamate. The mixture is stirred at room temperature for a period of eight hours, after which the excess borohydride is destroyed with aqueous acetic acid. The resulting mixture is concentrated to small volume under reduced pressure. The residue is taken up in chloroform and washed repeatedly with dilute hydrochloric acid and finally with water. After drying over anhydrous magnesium sulfate, the solvent is removed under reduced pressure to yield alpha-hydroxymethylhydrocinnamonitrile, boiling point/0.1 mm. 90° C.

*Example VII*

A cold solution of 10.7 parts by weight of 4-pyridinecarboxaldehyde, 11.2 parts by weight of ethyl cyanoacetate and 0.4 part by volume of piperidine is allowed to stand for about eight hours. The mixture is brought to room temperature and diluted with water. The crystalline precipitate is filtered and dried to yield ethyl alpha-cyano-beta-(4-pyridyl) acrylate, melting point 103° C.–104° C.

To a cooled, stirred suspension of 5.2 parts by weight of sodium borohydride in 45 parts by volume of 2-propanol is added slowly 10.1 parts by weight of solid ethyl alpha-cyano-beta-(4-pyridyl) acrylate. The mixture is stirred at room temperature for about eight hours, after which the excess borohydride is destroyed with dilute hydrochloric acid. The resulting mixture is concentrated under reduced pressure to remove most of the 2-propanol. The residue is made basic with potassium carbonate and shaken with methylene chloride. The organic layer is then dried over anhydrous potassium carbonate and concentrated to dryness. The residue is crystallized to yield alpha-hydroxymethyl-beta-(4-pyridyl) propionitrile, melting point 65° C.–68° C. Recrystallization from chloroform-ether raises the melting point to 68° C.–69° C.

*Example VIII*

1-(m-methylbenzyl)-piperizine, 29 parts by weight, and ethyl ethoxymethylenecyanoacetate, 26.5 parts by weight, are refluxed in 100 parts by volume of heptane for a period of eight hours. The ethyl 2-cyano-beta-[4-(m-methylbenzyl)piperazino] acrylate crystallizes on cooling. Filtration on recrystallization gives 30 parts by weight of material, melting at 105° C.–107.5° C.

To a stirred, cooled suspension of 3.6 parts by weight of sodium borohydride in 25 parts by volume of 2-propanol is added slowly 10 parts by weight of solid ethyl alpha - cyano-beta-[4-(m-methylbenzyl)piperazino] acrylate. The mixture is stirred for about eight hours at room temperature, after which the excess borohydride is destroyed with dilute hydrochloric acid. The resulting mixture is concentrated under reduced pressure to remove most of the 2-propanol. The residue is made basic with potassium carbonate and concentrated to dryness to give alpha-hydroxymethyl-beta-[4 - (m - methylbenzyl)piperazino] propionitrile. The residue is converted to its crystalline hydrochloride which melts at about 279° C.

*Example IX*

To a stirred solution of 0.85 part by weight of sodium borohydride in 10 parts by volume of 2-propanol is added slowly a solution of 2 parts by weight of ethyl diphenylcyanoacetate in 10 parts by volume of 2-propanol. The mixture is stirred for a period of eight hours, after which the excess borohydride is destroyed with aqueous acetic acid and the resulting mixture concentrated to small volume under reduced pressure. The residue is taken up in ether and washed repeatedly with dilute hydrochloric acid and finally with water. After drying over anhydrous magnesium sulfate, the solvent is removed to give a neutral oil which yields crystalline alpha, alpha-diphenyl-hydracrylonitrile, melting point 55° C.–58° C. when allowed to stand in ether solution.

*Example X*

To a mixture of 25 parts by weight of diphenylacetonitrile, 11.5 parts by weight para-formaldehyde, 100 parts by volume of tetrahydrofuran and 30 parts by volume of water is added slowly 5.5 parts by weight of calcium oxide. The mixture is stirred for a period of twelve hours, after which it is made acidic with 1.5 parts by volume of formic acid. After stirring for thirty minutes, 100 parts by volume of ether is added and the solution is decanted from the solid precipitate. The solution is concentrated to small volume under reduced pressure to remove most of the tetrahydrofuran, after which the residue is taken up with ether, washed several times with dilute hydrochloric acid and dried over anhydrous magnesium sulfate. Removing the solvent leaves an oil which gives crystalline alpha,alpha - diphenylhydracrylonitrile. The material melts at 65° C.–66° C.

*Example XI*

A mixture of 22 parts by weight of alpha-hydroxymethyl-3,4-dimethoxyhydrocinnamonitrile and 125 parts by volume of 20% hydrogen peroxide is made homogeneous with acetone. To this is added 30 parts by volume of a 10% solution of sodium carbonate and the mixture is stirred for three days at room temperature.

After destroying the excess peroxide with platinum, the mixture is concentrated under reduced pressure to give alpha - hydroxymethyl-3,4-dimethoxyhydrocinnamamide, melting point 144° C.–145° C.

*Example XII*

A mixture of 10 parts by weight of alpha-hydroxymethyl-3,4-dimethoxyhydrocinnamonitrile, 4.6 parts by weight of ethyl carbamate and 1 part by weight of aluminum isopropoxide in 100 parts by volume of toluene is brought to reflux under an asbestos jacketed Vigreux column and distillation effected until the head temperature reaches 110° C. Refluxing is continued for one hour, after which most of the toluene is removed under reduced pressure.

The residue is taken up in methylene chloride, washed with water and dried over anhydrous magnesium sulfate. The solvent is removed to give an oil which, when suspended in ethanol, yields crystalline alpha-carbamoyloxymethyl-3,4-dimethoxyhydrocinnamonitrile which on recrystallization from isopropyl alcohol gives a melting point of 119.5° C.–121° C.

*Example XIII*

A mixture of 10 parts by weight of alpha-hydroxymethyl-3,4-dimethoxyhydrocinnamamide, 3.8 parts by weight of ethyl carbamate and 0.5 part by weight of aluminum isopropoxide in 20 parts by volume of toluene is brought to reflux under an asbestos jacketed Vigreux column and distillation effected until the head temperature reaches 110° C. Refluxing is continued for one hour, after which most of the toluene is removed under reduced pressure. The residue is taken up in methylene chloride, washed with water and dried over anhydrous magnesium sulfate. The solvent is removed to give an oil which yields crystalline alpha-carbamoyloxymethyl-3,4-dimethoxyhydrocinnamamide, melting point 47.5° C.–49° C.

*Example XIV*

A cold solution of 21.4 parts by weight of 2-pyridinecarboxaldehyde, 22.6 parts by weight of ethyl cyanoacetate and 0.8 part by volume of piperidine in 60 parts by volume of dioxane is allowed to stand for one hour, after which it is brought to room temperature and diluted with water. The crystalline precipitate is filtered and dried to give ethyl alpha-cyano-beta-(2-pyridyl)acrylate, melting point 90° C.–94° C.

To a cooled, stirred suspension of 5.2 parts by weight of sodium borohydride in 45 parts by volume of 2-propanol is added slowly 10.1 parts by weight of ethyl alpha-cyano-beta-(2-pyridyl)acrylate. The mixture is stirred at room temperature for a period of eight hours, after which the excess borohydride is destroyed with dilute hydrochloric acid. The resulting mixture is concentrated under reduced pressure to remove most of the 2-propanol. The residue is made basic with potassium carbonate and shaken with methylene chloride. The organic layer is dried over anhydrous potassium carbonate and concentrated to dryness, leaving the alpha-hydroxymethyl-beta-(2-pyridyl) propionitrile as a liquid.

*Example XV*

A cold solution of 15.1 parts by weight of p-nitrobenzaldehyde, 11.3 parts by weight of ethyl cyanoacetate and 0.6 part by volume of piperidine in 70 parts by volume of dioxane is allowed to stand for one hour, after which it is brought to room temperature and diluted with water. The crystalline precipitate is collected and dried to yield ethyl alpha-cyano-4-nitrocinnamate, melting point 167° C.–172° C.

To a stirred, cooled suspension of 2.6 parts by weight of sodium borohydride in 60 parts by volume of 2-propanol is added slowly 15.5 parts by weight of solid ethyl alpha-cyano-4-nitrocinnamate. The mixture is stirred at room temperature for a period of twenty hours, after which the excess borohydride is destroyed with aqueous acetic acid. The resulting mixture is concentrated to small volume under reduced pressure. The residue is taken up in methylene chloride and washed repeatedly with dilute hydrochloric acid and dilute potassium carbonate solution. After drying over anhydrous magnesium sulfate, the solvent is removed under reduced pressure. The residue is distilled under vacuum to yield alpha-hydroxymethyl-4-nitrohydrocinnamonitrile.

*Example XVI*

A solution of 15.1 parts by weight of p-isopropylbenzaldehyde, 14.8 parts by weight of ethyl cyanoacetate and 0.6 part by volume of piperidine in 20 parts by volume of dioxane is allowed to stand in a refrigerator overnight, after which it is diluted with water. The oil which separates is dried over anhydrous magnesium sulfate and distilled at 0.2 mm. pressure. The fraction distilling at 135° C. is collected. It solidified upon standing in a refrigerator to give ethyl alpha-cyano-4-isopropylcinnamate, melting point 22.5° C.–24° C.

To a stirred, cooled suspension of 3.1 parts by weight of sodium borohydride in 80 parts by volume of 2-propanol is added 18.6 parts by weight of ethyl alpha-cyano-4-isopropylcinnamate. The mixture is stirred at room temperature for a period of twenty-four hours after which the excess borohydride is destroyed with aqueous acetic acid. The resulting mixture is concentrated to small volume after which the residue is taken up in methylene chloride. The organic solution is washed repeatedly with water, dried over anhydrous magnesium sulfate and concentrated to dryness at reduced pressure. The residue is distilled under vacuum to yield alpha-hydroxymethyl-4-isopropylhydrocinnamonitrile.

*Example XVII*

A cold solution of 28 parts by weight of p-chlorobenzaldehyde, 22.6 parts by weight of ethyl cyanoacetate and 1 part by volume of piperidine in 30 parts by volume of dioxane is allowed to stand for one hour, after which it is brought to room temperature and diluted with water. The crystalline precipitate is filtered and dried to yield ethyl alpha-cyano-4-chlorocinnamate, melting point 91° C.–92° C.

To a cooled, stirred suspension of 4.2 parts by weight of sodium borohydride in 125 parts by volume of 2-propanol is added 23.6 parts by weight of ethyl alpha-cyano-4-chlorocinnamate. The mixture is stirred at room temperature for a period of five hours, after which the excess borohydride is destroyed with aqueous acetic acid. The resulting mixture is concentrated to small volume under reduced pressure and the residue taken up in methylene chloride. The organic solution is washed repeatedly with water. After drying over anhydrous magnesium sulfate, the solvent is removed under reduced pressure and the residue distilled under vacuum to yield alpha-hydroxymethyl-4-chlorohydrocinnamonitrile.

*Example XVIII*

To a stirred, cooled suspension of 1 part by weight of ethyl alpha-cyano-3,4-dimethoxycinnamate in 10 parts by volume of tetrahydrofuran is added rapidly 5 parts by weight of lithium aluminum tri-tertiary butoxyhydride in 40 parts by volume of tetrahydrofuran. The mixture is brought to room temperature and allowed to stir overnight. The excess hydride is destroyed with water and the organic products extracted with methylene chloride. The neutral product obtained after washing the organic layer with dilute hydrochloric acid is alpha-hydroxymethyl-3,4-dimethoxyhydrocinnamonitrile, melting point after one recrystallization, 93° C.

*Example XIX*

To a suspension of 8.1 parts by weight of potassium borohydride in 50 parts by volume of 2-propanol is added 7 parts by weight of ethyl alpha-cyano-3,4-dimethoxycinnamate. The mixture is allowed to stand for a period of eight hours, after which the excess hydride is destroyed with dilute acetic acid. The organic products are extracted into methylene chloride, washed with dilute hydrochloric acid and dried over anhydrous magnesium sulfate. Removal of the solvent gives alpha-hydroxymethyl-3,4-dimethoxyhydrocinnamonitrile, melting point 93° C.

What is claimed is:
1. The compound alpha-hydroxymethyl-beta-phenylhydrocinnamonitrile.
2. The compound alpha-hydroxymethyl-3,4-dimethoxyhydrocinnamonitrile.
3. The compound alpha-hydroxymethyl-3,4-methylenedioxyhydrocinnamonitrile.
4. The compound alpha-hydroxymethyl-4-methoxyhydrocinnamonitrile.
5. The compound alpha-hydroxymethyl-3,4,5-trimethoxyhydrocinnamonitrile.
6. The compound alpha-hydroxymethylhydrocinnamonitrile.
7. The compound alpha,alpha-diphenylhydracrylonitrile.
8. The compound alpha-hydroxymethyl-3,4-dimethoxyhydrocinnamamide.
9. The compound alpha-carbamoyloxymethyl-3,4-dimethoxyhydrocinnamonitrile.
10. The compound alpha-carbamoyloxymethyl-3,4-dimethoxyhydrocinnamamide.
11. The compound alpha-hydroxymethyl-4-nitrohydrocinnamonitrile.
12. The compound alpha-hydroxymethyl-4-isopropylhydrocinnamonitrile.
13. The compound alpha-N-phenylcarbamoyloxymethyl-3,4-methylenedioxyhydrocinnamonitrile.
14. The compound alpha-hydroxymethyl-4-chlorohydrocinnamonitrile.
15. A compound of the formula

$$\begin{array}{c} CH_2OR \\ | \\ X-C-Z \\ | \\ A \end{array}$$

wherein Z is a member of the group consisting of nitrile and carbamoyl; A is a member of the group consisting of hydrogen and phenyl; X is a member of the group consisting of phenyl, benzhydryl, benzyl, loweralkoxybenzyl, di-loweralkoxybenzyl, tri-loweralkoxybenzyl, loweralkylbenzyl, chlorobenzyl, methylenedioxybenzyl and nitrobenzyl; and R is a member of the group consisting of hydrogen, carbamoyl and N-phenyl carbamoyl.

References Cited by the Examiner
UNITED STATES PATENTS

| | | | |
|---|---|---|---|
| 2,793,229 | 5/57 | Schlesinger et al. | 240—465 |
| 2,794,042 | 5/57 | Tanona et al. | 260—465 |
| 2,889,328 | 6/59 | Sherlock et al. | 260—268 |
| 2,899,436 | 8/59 | Morren et al. | 260—268 |
| 2,925,422 | 2/60 | Dickinson | 260—294.9 |
| 2,938,036 | 5/60 | Cislak | 260—294.9 |
| 2,952,861 | 9/60 | Dodson | 260—268 |
| 2,997,473 | 8/61 | Jongh et al. | 260—268 |
| 3,054,822 | 9/62 | Schorr et al. | 260—465 |

OTHER REFERENCES

Wasserman et al.: J. Am. Chem. Society, vol. 78, pages 2808–12 (1956).

IRVING MARCUS, *Primary Examiner.*

NICHOLAS S. RIZZO, WALTER A. MODANCE,
*Examiners.*